Feb. 23, 1960
F. E. MICHELSEN ET AL
2,925,870
EARTHSURFACING IMPLEMENT
Filed Oct. 14, 1957
2 Sheets-Sheet 1
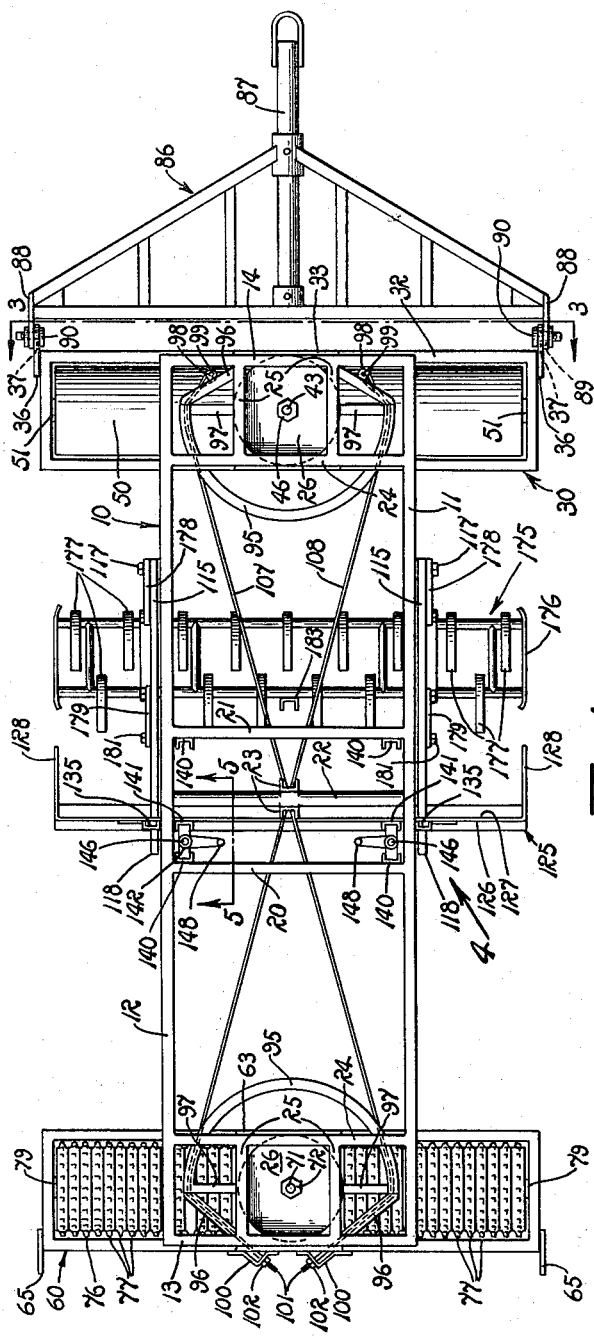
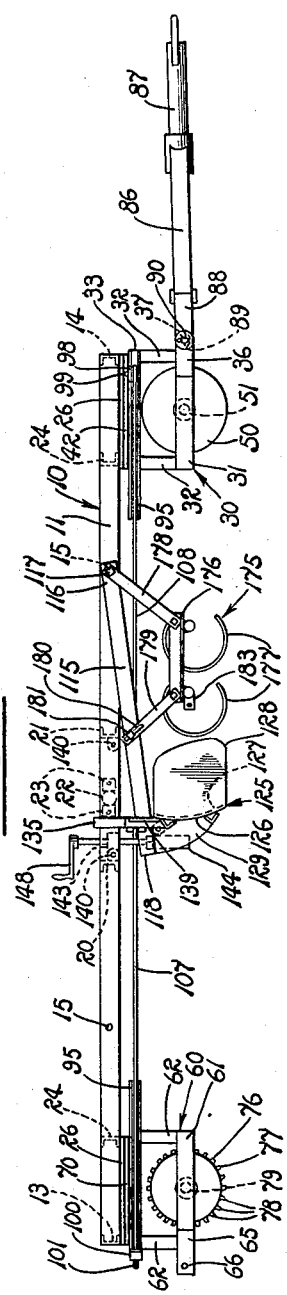
FREDERICK E. MICHELSEN
WALTER LAIKAM
INVENTORS
HUEBNER, BEEHLER & WORREL
ATTORNEYS
BY Richard M. Worrel Feb. 23, 1960   F. E. MICHELSEN ET AL   2,925,870
EARTHSURFACING IMPLEMENT
Filed Oct. 14, 1957   2 Sheets-Sheet 2

FREDERICK E. MICHELSEN
WALTER LAIKAM
INVENTORS
HUEBNER, BEEHLER & WORREL
ATTORNEYS

BY Richard M. Worrel

United States Patent Office 2,925,870
Patented Feb. 23, 1960

2,925,870
EARTHSURFACING IMPLEMENT

Frederick E. Michelsen and Walter Laikam, Fresno, Calif., assignors to Ethel R. Schmeiser, doing business as T. G. Schmeiser Co., Fresno, Calif.

Application October 14, 1957, Serial No. 690,014

5 Claims. (Cl. 172—146)

The present invention relates to an earthsurfacing implement and more particularly to an elongated, multifunctional, agricultural tool adapted to work the soil into different surface conditions incident to movement of the implement in opposite directions over the ground.

It is well-known that certain crops require precise surface conditions during different times of the growing season as well as before and after the growing season for seed bed conditioning and the like. For example, prior to planting the seed, it is usually desirable to break up large clods of dirt into smaller chunks, to plane the land into a substantially level condition, and finally to pulverize the broken clods into smaller particles so as to leave the surface of the soil with a fine texture. This soil condition disperses light rays impinging thereon and prevents burning of the plants and leaves sometimes caused when the surface remains smooth and highly light reflective.

Combined multi-functional implements have not been available in the past for modifying soil surface conditions unless considerable rearrangement of the parts was undertaken. Although land planes have been known for leveling the surface of the ground, they have not been capable of performing the other tasks described. Parenthetically, it is to be noted that the term "smoothing," as used in the art, means to provide a smooth soil surface generally for harvesting purposes whereas the term "preparing" means to provide the above described coarse, pebbly or fine soil texture usually desirable for planting and thereafter during most of the growing cycle.

Because it is necessary to level the land while performing the other described functions, the implement of the subject invention is built around the basic framework of a land plane. A land plane, as is well known, is of as great a length as is practical from structural and operational environmental considerations and relatively narrow width, sometimes being as much as thirty-five to fifty feet long and from eight to twelve feet wide so that vertical deviations of the front or rear ends do not have an appreciable effect on the elevational position of a planing tool, usually a scraper blade. However, the use of such a long frame introduces other problems, particularly where the implement is designed to perform multiple functions. Thus provision must be made for ease of turning especially in view of the drag or resistance created by tools which are disposed transversely of the frame. Further, because of lateral forces imposed on the scraper blade, especially while turning corners, provision must be made for opposing such forces and preventing damage to the mounting means for the blade.

Accordingly, it is a broad object of the present invention to provide predetermined soil conditions at proper times before, during, and after the growing cycle of agricultural crops.

Another object is to provide an earthsurfacing implement adapted to work the soil into different surface conditions incident to movement in opposite directions over the ground.

Another object is to provide an agricultural implement capable of performing multiple surfacing functions.

Another object is to enable travel of an agricultural implement in opposite directions with a minimum of structural modification.

Another object is to minimize the difficulties of turning an elongated implement supporting a plurality of earthworking tools normally tending to resist such turning.

Another object is to minimize and resist side sway of a scraper blade in a land plane.

Another object is to enable convenient elevational adjustment of such a scraper blade.

Another object is to provide an implement of the character described which is of low frame structure to facilitate working of earth surfaces beneath fig trees and other low hanging obstructions.

These, together with other objects, will become more fully apparent upon reference to the following description.

In the drawings:

Fig. 1 is a top plan view of an earthworking implement constructed in accordance with the principles of the present invention.

Fig. 2 is a side elevation of the implement as shown in Fig. 1.

Figure 3:
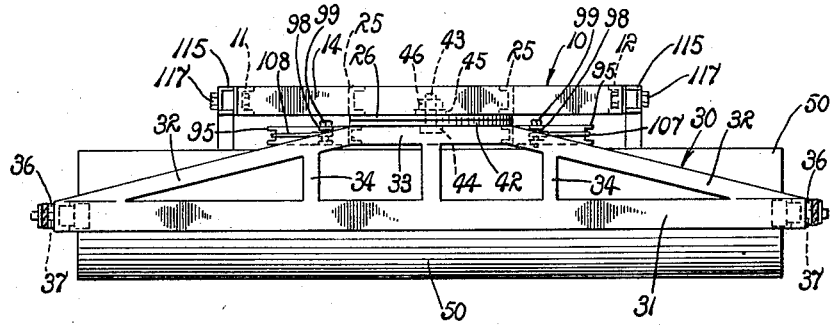
Fig. 3 is a somewhat enlarged vertical transverse section taken on line 3—3 of Fig. 1.

Referring more particularly to the drawings, an agricultural implement as provided by the present invention is illustrated and includes an elongated, substantially horizontal rectangular main frame 10. The main frame has a pair of laterally spaced, elongated, longitudinally extended side members 11 and 12, a pair of longitudinally spaced, transversely extended, opposite end members 13 and 14 rigidly interconnecting the side members in rectangular relation. Although not to be regarded as limiting, the main frame is preferably approximately thirty-five to fifty feet long by eight to twelve feet wide. The longitudinal side members are provided with axially aligned pairs of bores or openings 15 with the bores in each member being spaced longitudinally therealong.

The main frame 10 also has spaced transversely extended implement support struts 20 and 21 intermediate the opposite ends 13 and 14, and a transversely extended beam 22 between the struts. Channel-shaped brackets 23 are secured on opposite sides of the beam and face toward opposite ends of the frame. Further, elongated transversely extended trusses 24 are extended between the side members 11 and 12 in adjacent spaced relation to the end members, and spaced longitudinally extended braces 25 interconnect the trusses with their respectively adjacent end members. Substantially circular discs 26 are rigidly secured to the rectangularly arranged trusses, braces, and end frame members, on the underside of the main frame 10 and in a substantially horizontal plane.

A smoothing roller unit mounting frame 30 of substantially triangular form includes a rectangular lower portion 31, rectangular side portions 32 rigidly connected at opposite ends of the lower portion and converging upwardly, and a top portion 33 of rectangular form rigidly interconnecting the side portions and parallel to the lower portion. Webs 34 rigidly interconnect the side and top portions with the lower portion. Coupling arms 36 having axially aligned openings 37 are rigidly extended from the lower portion 31 at opposite ends of the unit frame and in transversely spaced parallel relation.

A circular plate 42, known in the art as a "fifth wheel," is rigidly secured to the top portion 33 and fitted in flush contact with the circular disc 26 at the end 14 of the main frame 10. An elongated vertical bolt 43 is upwardly extended concentrically through the blade and disc having a head 44 below the plate and a threaded end above the disc. A washer 45 is placed over the threaded end, and a nut 46 is screw-threaded thereon and tightened against the washer. As such, the unit frame 30 is mounted in an end of the main frame 10 transversely thereof, in a substantially horizontal position, and for horizontal pivotal movement about said bolt as a pivotal axis.

An elongated smoothing roller 50 having a smooth external cylindrical surface provides axially extended trunnions 51 journaled for rotation in the lower portion 31 of the unit frame 30 thereby mounting the roller for rotation in ground engagement about a substantially horizontal axis.

A pulverizing and compacting roller unit mounting frame 60 is of the same construction as the unit frame 30 and accordingly, the parts are referred to by corresponding identifying numerals without additional description. The frame 60 thus has a lower portion 61, side portions 62, a top portion 63, webs, not shown, eyelets 64, and coupling arms 65 having openings 66. Further, the unit frame 60 has a circular plate 70, and a bolt 71 provided with a nut 72 is extended concentrically through the blade and the disc 26 adjacent to the end 13 of the main frame 10.

A pulverizing and compacting roller 76 of substantially cylindrical form includes a plurality of independently elevationally movable rings 77 having radiating teeth 78 and mounted in side-by-side relation longitudinally of the roller. The roller also has axially extended trunnions 79 journaling the roller in unit frame 60 for rotatable movement around a horizontal axis. The roller 76 is of the type described in Patent No. 2,538,167 to T. G. Schmeiser issued January 16, 1951. It is to be understood that the smoothing roller 50 and the pulverizing and compacting roller can be interchanged and placed at the opposite ends of the frame. Further, smoothing rollers could be employed at both ends of the frames or pulverizing and compacting rollers could be utilized at opposite ends of the frame to the exclusion of the smoothing rollers.

A draft frame 86 includes an extended tongue 87 and a pair of laterally spaced parallel draft arms 88 extended in opposite directions from the tongue. The draft arms provide axially aligned apertures 89. The draft frame is adapted for connection to the main frame 10 by slidably fitting the draft arms against the coupling 36 or 65, and therefore at either end of the main frame, with the openings 37 or 77 in registration with the apertures 89. Releasable pivot pins 90 are provided for extension through the registering apertures and openings so as to connect the draft frame to the main frame for elevational pivotal movement.

Semi-cylindrical, substantially horizontal, coplanar sheaves 95 having cable guiding channels therein are individually mounted on the unit frames 30 and 60 and specifically, on the top portions 33 and 63 of these frames. The sheaves are inwardly convexly extended from the opposite ends 13 and 14 of the frame 10 and peripherally are individually substantially concentric to the bolts 43 and 71 constituting pivot axes for the unit frames. The sheaves provide endward extensions 96, and braces 97 extend from opposite ends of the channels inwardly for connection beneath the lower circular plates 42 and 70. At the end 14 of the frame, ears 98 are extended from the extensions and bolts 99 are positioned vertically in the ears, as best seen in Fig. 3. At the end 13 of the frame, angular brackets 100 extend endwardly from the top portion of the unit frame 60 and receive bolts 101 horizontally extended therethrough and having nuts 102 screw-threaded on their outer ends.

Elongated flexible cables 107 and 108 provide opposite ends individually and respectively connected to the bolts 99 on opposite sides of the sheave 95 mounted on the unit frame 30 and to the bolts 101 associated with the sheave mounted on the unit frame 60. The cables cross within the main frame 10 at approximately the center of the frame and tangentially engage the guide channels of the sheaves.

Elongated rigid mounting arms 115 provide forward ends 116 pivotally connected to the side frame members 11 and 12 on opposite sides of the main frame. For this purpose horizontal transversely extended, axially aligned pins 117 are releasably extended through the forward ends 116 of the arms and the aligned holes 15 in the side members 11 and 12. The mounting arms have rearwardly extended ends 118.

Figure 4:
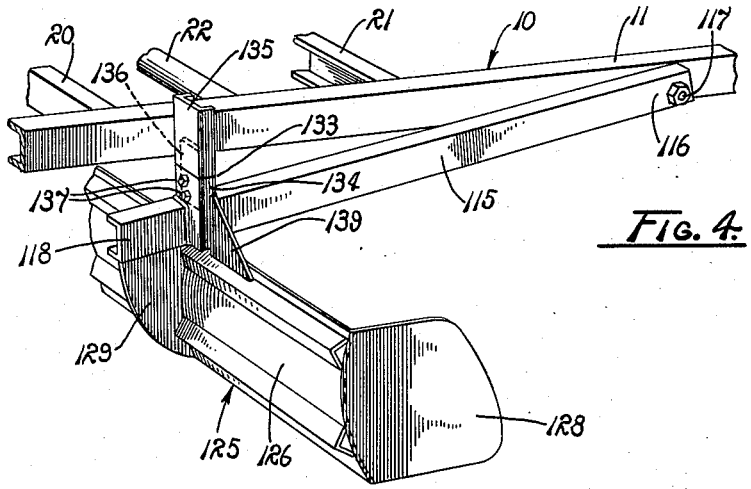
Fig. 4 is a somewhat enlarged fragmentary perspective taken from a position indicated by arrow 4 in Fig. 1 but with the spring tooth cultivator removed for illustrative convenience.

An elongated scraper blade 125 is rigidly connected to the rearward ends 118 of the mounting arms 115 so as to be mounted transversely on the main frame 10 intermediate its opposite ends 13 and 14 and thus the rollers 50 and 76. The blade has a rear convex surface 126 and a concave front surface 127. Side guards 128 are forwardly extended in substantially parallel relation at opposite ends of the blade. Preferably, longitudinally disposed gusset plates 129 extend between the rear ends of the mounting arms and the rear surface of the blade for imparting rigidity to the blade mounting. Channel-shaped anti-sway bars 133 are rigidly connected to the scraper blade 125 and are upwardly extended for slidable engagement with the longitudinal side frame members 11 and 12 on opposite sides of the main frame 10, as best seen in Figs. 1, 2, and 4. As best seen in Fig. 4, each anti-sway bar includes a lower portion 134 providing a pair of bores therein, and an upper portion 135. A bridging member 136 is secured, as by welding, to the inside central surface of the upper portion and is endwardly extended from said upper portion. The bridging members are placed against the inside central flanges of the lower portions of the anti-sway bars, and bolts 137 are extended through the bridging members and the bores in said lower portions. Nuts, not shown, are screw-threaded on the bolts for releasably interconnecting the upper and lower portions. Transversely disposed gusset plates 139 extend between the lower portions of the anti-sway bars and the scraper blade for imparting rigidity to the bars. With the anti-sway bars intact, the upper portions thereof extend upwardly into slidable engagement with the longitudinal side frame members, as described. When the upper portions are removed, however, the upper edges of the lower portions are below the main frame 10.

Figure 5:
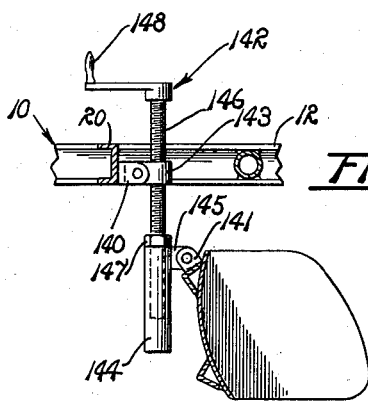
Fig. 5 is a somewhat enlarged vertical longitudinal section taken on line 5—5 of Fig. 1.

Opposed scraper frame lugs 140 are inwardly extended from the blade support struts 20 and 21 adjacent to the longitudinal side frame members 11 and 12. Blade lugs 141 are rearwardly upwardly extended from the rear surface 126 of the scraper blade 125, as best seen in Figs. 2 and 5. Elevational adjusting jacks 142 includes collars 143 releasably pivotally connected to laterally opposed pairs of frame lugs; elongated sleeves 144 having ears 145 pivotally connected to the blade lugs 141; and elongated threaded screws 146 screw-threadably extended through the collars and the sleeves. Lock nuts 147 are screw-threaded on the screws and tightened against the sleeves. Cranks 148 are connected to the upper ends of the screws for effecting rotation thereof.

A spring tooth cultivator 175 is also preferably incorporated in the implement and includes a substantially horizontal frame 176 having opposite ends and is disposed transversely beneath the main frame 10. The cultivator includes a plurality of arcuate spring teeth 177 of the well-known form extended downwardly and forwardly in the direction of travel of the cultivator from its frame. Front support links 178 provide lower ends pivotally connected to the cultivator frame and upper ends pivotally mounted on the pins 117 outwardly of the mounting arms 115. Rear support links 179 provide lower ends pivotally connected to the cultivator frame in spaced relation to the front links and upper ends provide longitudinal slots 180 and outwardly slidably engage the mounting arms 115. Bolts 181 are extended through the slots and the mounting arms for selectively adjustably connecting the rear links to the mounting arms. Furthermore, a cultivator frame lug 183 of channel-shape is rearwardly extended from the cultivator frame 176 and intermediate its opposite ends, as best seen in Fig. 1. The spring tooth cultivator illustrated merely typifies one of many implements which could be mounted in a similar manner in the frame. For example, a spiked tooth cultivator could equally as well be employed.

*Operation*

The operation of the described embodiment of the subject invention is believed to be readily apparent and is briefly summarized at this point.

In order to prepare the soil, that is, provide a coarse, minutely pock marked or pebbly soil texture, the draft frame 86 is connected to the smoothing roller end 14 of the main frame 10, as illustrated in Fig. 1. The jacks 142 are manipulated to provide the desired elevational adjustment of the scraper blade 125. The draft tongue 87 is connected to a prime mover, not shown, and the implement drawn over the ground to the right as viewed in Figs. 1 and 2.

The smoothing roller 50 engages the soil and breaks up large clods. The scraper blade 125 levels off the surface of the ground in the manner of a land plane. The pulverizing and compacting roller 76 pulverizes the broken-up clods as well as compacting the soil leaving the minutely pock marked surface desired.

It will be apparent that when traversing corners, the smoothing roller 50 is turned in one direction and the compacting roller is automatically turned in the opposite direction so as to track the smoothing roller. For example, if the implement is turned to the right, as viewed from a position looking toward the implement while standing at the end 13, the draft forces applied to the frame 86 turn the smoothing roller 50 to the right pulling forwardly and tighening the cable 107 and loosening the cable 108. This pulls forwardly on the right end of the compacting roller frame 60 and correspondingly pivots the left end of said frame rearwardly around the bolt 71. This pulls rearwardly on cable 108 to take up the slack and pulls the right end of the roller to the rear. In traveling with the compacting roller leading similar tracking occurs and is fully automatic. As the cables are respectively tightened and loosened, and the unit frames are pivoted, the ends of the cables move in and out of the channels of the sheaves 95. Since the cables are connected and held outwardly by the channels from the bolts 43 and 71, pull on the cables effects the described turning. This operation assures maximum maneuverability and adapts what is normally considered to be a large implement for use in even restricted spaces. The channels enable dependable operation of the cables and maintain them within the frame in position where they do not interfere with other working parts of the implement. By utilizing circular sheaves concentric to the pivot axes 43 and 71 of the frames the cables are always uniformly taut.

During turns and occasionally during straightway operations, side thrust is imposed on the scraper blade 125. This is minimized by the location of the scraper approximately midway between the smoothing roller 50 and the compacting roller 76. Further, the anti-sway bars 135 are rigidly extended upwardly from the arms 115 in slidable engagement with the frame and effectively resist such side thrust.

Later on in the season prior to harvesting, it is usually desirable to provide a smooth soil surface. The subject implement is adapted to provide such a surface. The pins 117 are disconnected and the bolts 181 are loosened to permit the mounting arms to slide downwardly relative to the rear links 179 so that the mounting arms and the front and rear links 178 and 179 are below the main frame 10. Further, the upper portions 135 or the anti-sway bars 133 are removed.

Thereupon, the jacks 142 are disconnected from their positions interconnecting the main frame lugs 140 and the scraper frame lugs 141. The main frame 10 is then moved forwardly until the bracket 23 is immediately above the cultivator lug 183. The collar 143 of one of the jacks is then pivotally connected to the bracket 23 disposed toward the cultivator 175 and the ear 145 of such jack is pivotally connected to the cultivator frame lug 183. Although these connections are not shown, they are precisely like those shown in Fig. 5 where connection of a jack to the main frame and to the scraper blade is illustrated. The jack is then elevated to raise both the scraper blade and the cultivator off of the ground. The blade and the cultivator are then given a 180° turn by hand and thereby pivoted around the jack screw 146 as an axis to reverse the positions of the blade and the cultivator, as illustrated in Fig. 1. The jack used for turning the blade and the cultivator around is then removed and the jacks individually pivotally interconnected between the blade lugs 141 and the frame lugs opposite to those which were previously employed. This connection is also of the type shown in Fig. 5. The arms 114 are again connected to the main frame but this time adjacent to the end 13 in the holes 15 provided in the longitudinal side members 11 and 12. The support links 178 and 179 are re-connected to the mounting arms, and the upper portions 135 of the anti-sway bars 133 are connected. The coupling pins 90 are released and the draft frame 86 connected to the unit frame 60 associated with the compacting roller 76. As such, the implement is ready for operation in an opposite direction to that illustrated in Fig. 1, the entire rearrangement being easily accomplished by one man.

Again, the draft frame is connected to a prime mover, not shown, and the implement drawn over the earth. The pulverizing and compacting roller 76 performs its usual function as does the scraper blade 125. However, since the smooth surfaced roller 50 is last, it smooths the surface of the soil. In other respects, the implement operates as before to negotiate turns and to resist side sway of the scraper blade.

From the foregoing, it will be evident that an earthwork implement has been provided which is capable of multiple functions and which is adapted to work the soil into different surface conditions upon movement in opposite directions over the ground. The implement is adapted to negotiate very sharp corners notwithstanding its length. Of special significance is the provision of an elevationally adjustable scraper blade and anti-sway bars thereon for resisting side sway of the scraper blade relative to the frame. Further, the construction of the unit frames and their connection below the main frame provides an implement of minimum height adapted to work the soil beneath low hanging trees and the like. In addition, the implement is conveniently adapted for travel in opposite direcitons and thereby to perform distinctly different soil surfacing operations.

Although the invention has been herein shown and described in what is conceived to be the most practical and preferred embodiment, it is recognized that departures may be made therefrom within the scope of the invention, which is not to be limited to the details disclosed therein but is to be accorded the full scope of the claims so as to embrace any and all equivalent devices and apparatus.

Having described our invention, what we claim as new and desire to secure by Letters Patent is:

1. An earthworking implement adapted for earth traversing movement in opposite directions along a predetermined line of travel comprising an elongated substantially horizontal rectangular main frame having opposite sides and oppositely extended ends, the sides of the frames having pairs of transversely aligned holes and at opposite ends thereof; ground engaging means mounting the opposite ends of the frame for earth traversing movement along a predetermined path relative to the frame; laterally spaced coupling arms endwardly extended from the mounting means at opposite ends of the frame having axially aligned openings; a draft frame providing an extended draft tongue and a pair of oppositely extended draft arms having aligned apertures and fitted in overlapping relation with the coupling arms at an end of the main frame with the apertures and the openings in registration; horizontal pins extended through the registered openings and apertures mounting the draft frame for elevational pivotal movement relative to the main frame; elongated mounting arms having forward ends and rearwardly extended ends; bolts releasably extended through the forward ends of the mounting arms and an aligned pair of holes at an end of the frame; an elongtaed ground engaging scraper blade rigidly secured to the rearward ends of the arms and extended transversely of the main frame for elevational adjustable movement on the arms relative to the main frame around the pivot pins as an axis; a frame lug mounted in the main frame; a scraper blade lug mounted on the scraper blade; an elongated telescopically adjustable jack having an upper end portion pivotally connected to the frame lug and a lower end portion pivotally connected to the blade lug for elevational adjustable movement of the scraper blade incident to expansion and contraction of the jack; anti-sway bars including lower portions rigidly mounted on the scraper blade and upper portions releasably connected to the lower portions and upwardly extended in slidable engagement with opposite sides of the main frame to oppose side thrusts imposed by the blade on the mounting arms; a cultivator extended transversely of the main frame in longitudinally spaced relation to the scraper blade and having opposite ends; front links having upper ends pivotally mounted on the bolts and lower ends pivotally connected to the cultivator; rear links having lower ends pivotally connected to the cultivator and upper ends providing longitudinal slots and in overlapping engagement with the mounting arms intermediate their ends; studs extended through the slots of the rear links and the mounting arms and adjustably selectively connecting the rear links to the mounting arms; a cultivator lug mounted on the cultivator intermediate its opposite ends; and a bracket mounted on the main frame above and in substantially the same vertical plane longitudinally of the main frame as the cultivator lug whereby upon release of the pins, the bolts and the studs, and removal of the upper portions of the anti-sway bars, the jack can be disconnected from said frame and blade lugs and pivotally interconnected between the bracket and the cultivator lug for elevating the blade and the cultivator for swinging movement of the blade and cultivator between opposite positions directed towards opposite ends of the main frame.

2. In an earthworking implement adapted for earth traversing movement in opposite directions along a predetermined line of travel, an elongated substantially horizontal rectangular main frame having opposite sides and oppositely extended ends; ground engaging means mounting the opposite ends of the frame for earth traversing movement along a predetermined path relative to the frame; elongated mounting arms having forward ends and rearwardly extended ends; means pivotally connecting the forward ends of the mounting arms intermediate the ends of the frame for elevational pivotal movement of the arms relative to the frame; an elongated first ground engaging earthworking tool rigidly secured to the rearward ends of the arms and extended transversely of the main frame for elevational adjustable movement with the arms relative to the main frame; a frame lug mounted in the main frame; a first tool lug mounted on the first tool; an elongated longitudinally adjustable member pivotally interconnecting the frame lug and the first tool lug for elevational adjustable movement of the tool incident to longitudinal adjustment of the member; a second elongated earthworking tool extended transversely of the main frame in longitudinally spaced relation to the first earthworking tool; means interconnecting the arms and the second earthworking tool supporting the second tool on the arms; a second tool lug mounted on the second tool; and a bracket mounted on the main frame above and in substantially the same vertical plane longitudinally of the main frame as the second tool lug whereby upon release of the arms from the main frame and disconnection of the adjustable member from the frame and first tool lug, the adjustable member can be pivotally interconnected between the bracket and the second tool lug for elevating the first and second tools for swinging movement thereof between opposite positions directed toward opposite ends of the main frame.

3. The implement of claim 2 wherein the adjustable member is a telescopic screw jack having upper and lower portions rotatably screw-threadably interconnected.

4. The earthworking implement of claim 2 wherein the ground engaging means includes elongated earthsurfacing rollers disposed transversely at opposite ends of the frame.

5. In an earthworking implement adapted for earth traversing movement selectively in opposite directions along a predetermined line of travel with respect thereto, an elongated substantially horizontal rectangular main frame having opposite sides and oppositely extended ends; ground engaging means mounting the opposite ends of the frame for said earth traversing movement; elongated mounting arms having forward ends and rearwardly extended ends; means pivotally connecting the forward ends of the mounting arms to the frame intermediate the ends of the frame with the rearward ends rearwardly extended therefrom for elevational pivotal movement; an elongated ground engaging earthworking tool rigidly secured to the rearwardly extended ends of the arms and extended transversely of the main frame for elevational adjustable movement with the arms relative to the main frame; a pair of frame lugs rigidly mounted on the main frame in transversely spaced relation to each other and above the tool; a pair of first tool lugs mounted on the tool in laterally spaced relation, there being a first tool lug below each frame lug; a pair of elongated longitudinally adjustable members individually pivotally interconnecting corresponding frame lugs and first tool lugs for elevational adjustable movement of the tool incident to longitudinal adjustment of the members; a second tool lug rigidly mounted on the tool intermediate and in longitudinally spaced relation to the first tool lugs with respect to the main frame; and a bracket mounted on the main frame above and in substantially the same vertical plane longitudinally of the main frame as the second tool lug, whereby upon release of the arms from the main frame and disconnection of the adjustable members from the frame lugs and the first tool lugs, one of the adjustable members can be pivotally interconnected between the bracket and the second tool lug for elevating the tool for swinging movement thereof between opposite positions directed toward opposite ends of the main frame.

References Cited in the file of this patent

UNITED STATES PATENTS

| | | |
|---|---|---|
| 588,194 | Taylor | Aug. 17, 1897 |
| 865,162 | Coldwell | Sept. 3, 1907 |
| 1,113,101 | Chase | Oct. 6, 1914 |
| 1,637,208 | Wilson | July 26, 1927 |
| 1,989,431 | Stamm | Jan. 29, 1935 |
| 2,586,977 | Moody | Feb. 26, 1952 |
| 2,612,090 | Revers | Sept. 30, 1952 |
| 2,787,847 | Arps | Apr. 9, 1957 |